United States

Shimomura et al.

[11] 4,147,410
[45] Apr. 3, 1979

[54] TWO GROUP WIDE ANGLE ZOOM LENS SYSTEM

[75] Inventors: Masaichi Shimomura, Sakai; Mitsuaki Horimoto, Osaka, both of Japan

[73] Assignee: Minolta Camera Kabushiki Kaisha, Osaka, Japan

[21] Appl. No.: 848,407

[22] Filed: Nov. 4, 1977

[30] Foreign Application Priority Data

Nov. 12, 1976 [JP] Japan ............................... 51-136627

[51] Int. Cl.² ............................................. G02B 15/16
[52] U.S. Cl. ................................................... 350/184
[58] Field of Search ................................. 350/184–187

[56] References Cited
FOREIGN PATENT DOCUMENTS 2557547  7/1976  Fed. Rep. of Germany ........... 350/184

*Primary Examiner*—Conrad J. Clark
*Attorney, Agent, or Firm*—Harold L. Jackson; Stanley R. Jones; Joseph W. Price

[57] ABSTRACT

A wide angle zoom lens system for use with a 35 mm single lens reflex camera is provided. The zoom lens system is relatively compact and includes two lens groups that can be relatively displaced along the optical axis to provide variation in focal length as desired. The first lens group has a negative refractive power and the image side second lens group has a positive refractive power. The relationship of their refractive powers has been selected to provide adequate correction of aberrations while maintaining the size, weight and compactness required in a modern zoom lens system with wide angle capability.

8 Claims, 20 Drawing Figures

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

TWO GROUP WIDE ANGLE ZOOM LENS SYSTEM

BACKGROUND OF THE INVENTION

1. Field of the Invention

The present invention is directed to a relatively compact wide angle zoom lens system capable of providing a field angle approaching 84 degrees while sufficiently balancing the aberrations that occur over the entire range of zooming.

2. Brief Description of the Prior Art

The use of zoom lens systems have been becoming increasingly popular with amateur photographers and various examples are well known in the commercial market. As is well known by optical designers, the optimization of an image transmission through the zoom lens system for all points along the variable focal length is a constant problem. It is also well known that a zoom lens system is not readily adapted to a wide angle format particularly when it is also desired to maintain a relatively light weight compact lens system.

Finally, the competitive factor of cost competition adds a non-technological but nevertheless real limitation to the design variables that optical designers can utilize in maximizing their optical designs.

Various forms of two lens group zoom lens systems have been suggested in the prior art such as disclosed in the German Offenlegungsschrift of July 8, 1976; Japanese patent publication No. 40-8985; Japanese patent application laid open to public inspection No. 49-2548 and Japanese patent application laid open to public inspection No. 51-83543.

The German Offenlegungsschrift publication is of particular interest in that it discloses a two lens group zoom lens system wherein the first negative lens group is of a type which has a positive front component, a positive rear component and a negative component interposed between the front and rear lens components. The two lens group zoom lens system of this type is suitable for a zooming mode of operation in the range of wide angle photography since it provides a power distribution of a retrofocus type. However, the spherical aberration related to the higher order aberration coefficients tends to be insufficiently corrected when the lens system is set at the longest focal length. Additionally, substantial variation of aberrations such as distortion and coma occur during the variation of the focal length.

Thus, the prior art is still seeking to provide a relatively compact and economical wide angle two lens group zoom lens system with adequate optical correction.

SUMMARY OF THE INVENTION

It is an object of the present invention to provide a two group wide angle zoom lens system having an excellent correction of aberrations across the entire zooming mode of operation.

Another object of the present invention is to provide a two lens group wide angle zoom lens system having a zoom range capable of providing a wide angle field of approximately 84 degrees.

It is still another object of the present invention to provide the two lens group wide angle zoom lens system in a compact size.

A further object of the present invention is to provide a two lens group wide angle zoom lens system capable of achieving the above objects by determining specific arrangements and power distributions in the first and second lens groups to accomplish the above objects.

The present invention provides a two lens group wide angle zoom lens system capable of varying the focal length of the system by relative movement of the two lens groups. A first lens group, on the object side, has a negative refractive power and further includes a first lens component of a positive refractive power, a second intermediate lens component of a negative refractive power, and a third rear lens component of a positive refractive power. Additionally, the second intermediate lens component on the first lens group includes at least three sub lens components wherein their absolute refractive power is progressively decreased from the object to image side along the optical axis. The second lens group on the image side of the first lens group has an overall positive refractive power and further includes a fourth front lens component of a positive refractive power $\Phi_{II\text{-}1}$, a fifth intermediate lens component of a negative refractive power and a sixth rear lens component of a positive refractive power. The wide angle zoom lens system of the present invention fulfills the following conditions to provide a compact, aberration corrected, wide angle zoom lens system;

$$1.1 \leq |\Phi_{II}/\Phi_I| \leq 1.5 \tag{1}$$

$$0.1 \leq |\Phi_{I\text{-}1}/\Phi_I| \leq 0.5 \tag{2}$$

$$0.3 \leq |\Phi_1/\Phi_{I\text{-}2}| \leq 0.6 \tag{3}$$

$$1.4 \leq |\Phi_{II\text{-}1}/\Phi_{II}| \leq 1.8 \tag{4}$$

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENT

The following description is provided to enable any person skilled in the optical and camera field to make and use the invention and sets forth the best modes contemplated by the inventors of carrying out their invention. Various modifications, however, will remain readily apparent to those skilled in the arts since the generic principles of the present invention have been defined herein specifically to provide a relatively economical and easily manufactured wide angle zoom lens system.

The derivation of the formulae and the relation of powers set forth herein can be accomplished with the assistance of the computer. The present invention represents the parameters of a compromised balance of acceptable aberrations which can be relatively easily manufactured to provide a low cost lens system for utilization with a 35 mm SLR camera.

Figure 1:
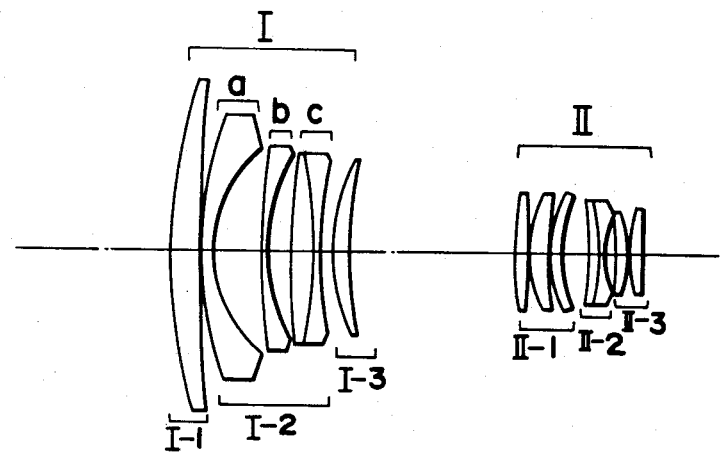
FIG. 1 is a schematic view of a first embodiment of the present invention.
Figure 2:
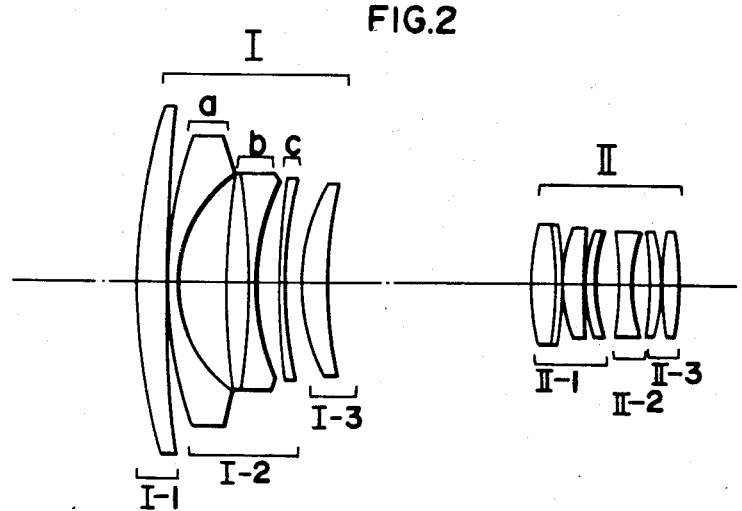
FIG. 2 is a schematic view of a second embodiment of the present invention.

As can be seen in each of the embodiments of the present invention disclosed in FIGS. 1 and 2, a wide angle zoom lens system having a first and second lens group is provided. As can be appreciated the symbols which designate the particular lenses should be understood in the specification and the claims to be interpreted broadly enough to cover either a single lens element or an equivalent comprising a group of two or more lens elements such as a doublet.

Referring to the embodiments disclosed in FIGS. 1 and 2, the respective relatively movable lens groups for providing the zooming mode of operation are designated as a first lens group I and a second lens group II. The first lens group I provides an overall negative refractive power $\Phi_I$ and can be generically classified as including a first front lens component I-1 of a positive refractive powder, $\Phi_{I-1}$, a second intermediate lens component I-2 of a negative refractive power, $\Phi_{I-2}$ and a third lens component I-3 of a positive refractive power. The three lens components forming the first lens group are positioned respectively from the object to image side on the optical axis. The first lens group and more particularly the second intermediate lens component I-2 further includes a first sub-component a of refractive power $\phi_1$, a second sub-component b of a refractive power, $\phi_2$ located at the image side of the first sub-component and a third sub-component c of a refractive power, $\phi_3$ located at the image side of the second sub-component. The absolute value of the refractive powers of these sub-components bear the following relationship;

$$|\phi_1| > |\phi_2| > |\phi_3|$$

The second or rear lens group II has a positive refractive power, $\Phi_{II}$ and includes a fourth front lens component II-1 of a positive refractive power, $\Phi_{II-1}$, a fifth intermediate lens component II-2 of a negative refractive power located at the image side of the fourth lens component and a sixth rear lens component II-3 of a positive refractive power located at the image side of the fifth lens component.

In order to achieve the objectives of a wide angle zoom lens system of the present invention, the present inventors have discovered that the inventive zoom lens system must fulfill the following conditions;

$$1.1 \leq |\Phi_{II}/\Phi_I| \leq 1.5 \qquad (1)$$

$$0.1 \leq |\Phi_{I-1}/\Phi_I| \leq 0.5 \qquad (2)$$

$$0.3 \leq |\phi_1/\phi_{I-2}| \leq 0.6 \qquad (3)$$

$$1.4 \leq |\Phi_{II-1}/\Phi_{II}| \leq 1.8 \qquad (4)$$

The zooming mode of operation, or variation of the focal length, is achieved by shifting both the first and second lens groups I and II to change the air space formed therebetween. As is readily apparent from FIGS. 1 and 2, the third lens component I-3 of the first lens group I includes a positive meniscus lens element; the fourth lens component II-1 of the second lens group II requires two or more lens elements and the sixth lens component II-3 of the second group can require one or more lens elements.

With reference to the above condition (1) by adherence to those parameters, the ratio of the refractive power $\Phi_I$ of the first lens group I to the refractive power $\Phi_{II}$ of the second lens group II is controlled. In the two group zoom lens systems, the manner of shifting of the lens groups for the zooming mode of operation is thereby determined and further the size and operability of the entire lens system is dictated by the above condition (1).

If the design parameter of a wide angle zoom lens system was permitted to extend beyond the upper limit of the condition (1), the refractive power of the second lens group would be increased to such an extent that the back focal distance at the extreme wide angle position would become too short for a 35 mm single lens reflex camera. As a practical matter, this would interfere with the pivotal movement of the mirror in the camera body.

If the large refractive power of the second group exceeded the upper limit of condition (1), the aperture ratio of the second lens group would increase so that the correction of aberrations would not be feasible unless the actual number of lens elements were also increased. Obviously, this would defeat the purpose of a compact relatively light weight lens system which is one of the main purposes of the present invention. Finally, if the lower limit of condition (1), was violated, distortion would be increased considerably at the extreme wide angle setting.

The second condition (2), is directly related to the refractive power $\Phi_{I-1}$, of the first front lens component I-1 of the first lens group I and is a primary condition that must be satisfied particularly to correct distortion while, at the same time, permitting the entire lens system to be compact. If the design parameters extended beyond the upper limit of condition, (2), the distortion which would result at the extreme wide angle setting could still be corrected but it would then become necessary to increase the diameter of the first front lens component I-1 to thereby transmit the off-axial ray defining the field angle to the succeeding second intermediate component I-2, thus increasing the size of the lens system beyond that of a practical size for a 35 mm single lens reflex camera.

Alternatively, if the design parameters provided a value below the lower limit of condition (2), the distortion of the first front lens component I-1 could not be sufficiently corrected and the refractive power of the second intermediate lens component I-2 in the first lens group I would be too weak to permit an adequate correction of the spherical aberration which would occur in the higher order aberration coefficients existing at the extreme telephoto setting.

The actual power distribution provided by the negative second component I-2 in the first lens group I is of particular importance in the present invention in order to provide a maximum field angle that can be as large as 84 degrees. If it was assumed that this second lens component I-2 really consisted of two sub lens components, the correction of both the distortion and astigmatism involved in a large field angle would be extremely difficult. Accordingly, within the parameters of the present invention it has been suggested, for providing satisfactory aberration corrections and to render the lens system compact, to construct the second component lens I-2 from three individual sub-component lenses having negative powers $\phi_1$, $\phi_2$, and $\phi_3$, respectively from the object to image side, and to meet the following conditions;

$$|\phi_1| > |\phi_2|1 > |\phi_3|$$

In addition to this particular power distribution of the second component I-2, it is important that the refractive power $\phi_1$ of the first sub-component a bear the following relationship to the refractive power $\Phi_{I-2}$, as set forth in condition (3), above. If the upper limit of condition (3) is violated, then the distortion and astigmatism generated at the first sub-component a cannot be corrected by any combination of power distributions of the first lens component I-1, second sub-component b and third sub-component c. If the lower limit of condition (3), is not maintained, the first lens group I would be provided with a relatively weak power distribution and if the goal of providing a maximum field angle as large as 84 degrees is achieved, it would be inevitable that the diameter of the first lens group I would have to be increased which would eliminate the possibility of providing a compact wide angle zoom lens system.

The refractive power $\Phi_{II}$ of the second lens group II must be provided with a relatively large aperture ratio because of the negative refractive power of the first lens group I. However, since an object of this invention is to provide a compact wide angle zoom lens, it has been found unsuitable to introduce a gauss type lens group into the second lens group II. Therefore, the present invention employs, for its second lens group II, a modified triplet type of lens group such that its object side principal point will approach the first lens group as much as possible and, from the standpoint of a large aperture ratio, a positive refractive power can be realized by two or more lens elements arranged in the fourth front lens component II-1. The parameters set forth in condition (4), are related to this design decision with respect to the second lens Group II and by maintaining the lens designs within these parameters it is possible to suppress any changes in the spherical aberration during a zooming mode of operation while at the same time, maintaining a compact overall construction to the zoom lens system. If the upper limit of condition (4), is exceeded, then an under-correction of spherical aberration will take place at the extreme telephoto setting and the expected changes in spherical aberration relating to the higher order aberration coefficients due to zooming will be increased. If the design parameters fall below the lower limit of condition (4) the spherical aberration changes will also be increased. Finally, since the fourth front component II-1 of the second lens group II provides a large contributory factor in the determination of the Petzval sum of the entire lens system, it also contributes significantly to the change in field curvature. Therefore, if the design falls beneath the lower limit of condition (4), the Petzval sum would be reduced to such a value that the positive deviation of sagittal surface in the zonal to marginal areas would become significant at the extreme wide angle setting.

The following Tables 1 and 2 disclose respectively a first and second embodiment of the present invention.

In the Tables, f equals the focal length, $\omega$ equals the field angle, r is the radius of curvature with the respective sub-numbers indicating the surfaces from the object to image side along the optical axis, d represents the axial distance and includes both the air spaces and the actual thickness of the lens components along the optical axis. N equals the refractive index and again the sub-number refers to the particular optical element from the object to image side and finally, $v$ equals the Abbe number and the sub-numbers refer to the specific lens elements from the object to image side. The air space $D_{11}$ in the Tables are provided with three separate values that disclose the relative displacement between the first and second lens groups for the respective focal lengths of f=50, f=35 and f=24.

Table 1

| (Embodiment 1) f = 50 ~ 24 | FNo. = 4 | Field Angle 2$\omega$ = 47°~84° | |
|---|---|---|---|
| Radius of Curvature | Axial Distance | Refractive Index | Abbe Number |
| $r_1$ = 94.69 | $d_1$ = 6.0 | $N_1$ = 1.6000 | $v_1$ = 64.4 |
| $r_2$ = 417.7 | $d_2$ = 0.2 | | |
| $r_3$ = 73.24 | $d_3$ = 1.5 | $N_2$ = 1.7435 | $v_2$ = 49.2 |
| $r_4$ = 21.13 | $d_4$ = 7.5 | | |
| $r_5$ = 148.3 | $d_5$ = 1.5 | $N_3$ = 1.7435 | $v_3$ = 49.2 |
| $r_6$ = 32.70 | $d_6$ = 3.5 | | |
| $r_7$ = 129.8 | $d_7$ = 4.0 | $N_4$ = 1.7106 | $v_4$ = 43.3 |
| $r_8$ = −86.70 | $d_8$ = 1.0 | $N_5$ = 1.6385 | $v_5$ = 55.7 |
| $r_9$ = 66.78 | $d_9$ = 2.5 | | |
| $r_{10}$ = 33.47 | $d_{10}$ = 3.0 | $N_6$ = 1.7174 | $v_6$ = 29.4 |
| $r_{11}$ = 78.98 | $d_{11}$ = 1.66, 11.96, 27.93 | | |
| $r_{12}$ = 53.95 | $d_{12}$ = 2.5 | $N_7$ = 1.5168 | $v_7$ = 64.0 |
| $r_{13}$ = −159.9 | $d_{13}$ = 0.1 | | |
| $r_{14}$ = 19.80 | $d_{14}$ = 3.36 | $N_8$ = 1.5168 | $v_8$ = 64.0 |
| $r_{15}$ = 136.34 | $d_{15}$ = 0.1 | | |
| $r_{16}$ = 22.44 | $d_{16}$ = 2.0 | $N_9$ = 1.5168 | $v_9$ = 64.0 |
| $r_{17}$ = 32.82 | $d_{17}$ = 4.5 | | |
| $r_{18}$ = −61.82 | $d_{18}$ = 2.0 | $N_{10}$ = 1.8052 | $v_{10}$ = 25.4 |
| $r_{19}$ = −24.57 | $d_{19}$ = 0.8 | $N_{11}$ = 1.7569 | $v_{11}$ = 29.7 |
| $r_{20}$ = 18.24 | $d_{20}$ = 2.19 | | |
| $r_{21}$ = −57.47 | $d_{20}$ = 2.0 | $N_{12}$ = 1.5168 | $v_{12}$ = 64.0 |
| $r_{22}$ = −20.76 | $d_{22}$ = 0.1 | | |
| $r_{23}$ = 38.02 | $d_{23}$ = 2.3 | $N_{13}$ = 1.6000 | $v_{13}$ = 64.4 |
| $r_{24}$ = −375.8 | | | |

Table 2

| (Embodiment 2) f = 50 ~ 24 | FNo. = 4 | Field Angle 2$\omega$ = 47°~84° | |
|---|---|---|---|
| Radius of Curvature | Axial Distance | Refractive Index | Abbe Number |
| $r_1$ = 88.282 | $d_1$ = 5.5 | $N_1$ = 1.6129 | $v_1$ = 37.0 |
| $r_2$ = 245.72 | $d_2$ = 0.2 | | |
| $r_3$ = 68.959 | $d_3$ = 1.5 | $N_2$ = 1.7425 | $v_2$ = 52.2 |
| $r_4$ = 22.913 | $d_4$ = 8.0 | | |
| $r_5$ = 106.47 | $d_5$ = 4.5 | $N_3$ = 1.7352 | $v_3$ = 40.9 |
| $r_6$ = −122.30 | $d_6$ = 1.0 | $N_4$ = 1.7003 | $v_4$ = 47.7 |
| $r_7$ = 36.438 | $d_7$ = 3.9 | | |
| $r_8$ = 131.29 | $d_8$ = 1.2 | $N_5$ = 1.7130 | $v_5$ = 53.9 |
| $r_9$ = 80.156 | $d_9$ = 2.5 | | |
| $r_{10}$ = 30.936 | $d_{10}$ = 4.0 | $N_6$ = 1.6259 | $v_6$ = 35.7 |
| $r_{11}$ = 59.160 | $d_{11}$ = 1.7, 15.7, 35.5 | | |
| $r_{12}$ = 53.715 | $d_{12}$ = 3.5 | $N_7$ = 1.5891 | $v_7$ = 61.1 |
| $r_{13}$ = −80.203 | $d_{13}$ = 1.0 | $N_8$ = 1.5762 | $v_8$ = 41.4 |
| $r_{14}$ = −152.44 | $d_{14}$ = 0.1 | | |
| $r_{15}$ = 21.005 | $d_{15}$ = 4.0 | $N_9$ = 1.5168 | $v_9$ = 64.0 |
| $r_{16}$ = 115.51 | $d_{16}$ = 0.1 | | |
| $r_{17}$ = 24.086 | $d_{17}$ = 2.0 | $N_{10}$ = 1.5168 | $v_{10}$ = 64.0 |
| $r_{18}$ = 34.240 | $d_{18}$ = 4.0 | | |
| $r_{19}$ = −75.602 | $d_{19}$ = 1.8 | $N_{11}$ = 1.7569 | $v_{11}$ = 31.8 |
| $r_{20}$ = 19.944 | $d_{20}$ = 2.9 | | |
| $r_{21}$ = −66.497 | $d_{21}$ = 2.7 | $N_{12}$ = 1.6510 | $v_{12}$ = 55.8 |
| $r_{22}$ = −31.604 | $d_{22}$ = 0.1 | | |
| $r_{23}$ = 114.90 | $d_{23}$ = 3.0 | $N_{13}$ = 1.6510 | $v_{13}$ = 55.8 |
| $r_{24}$ = −49.290 | | | |

Figure 3A:
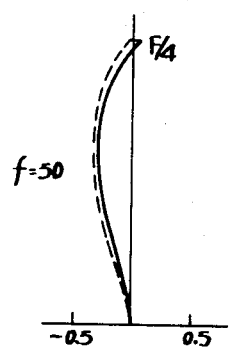
FIGS. 3a, 3b and 3c are respectively graphical plots of the spherical aberration, astigmatism and distortion for f=50 of the first embodiment.
Figure 3B:
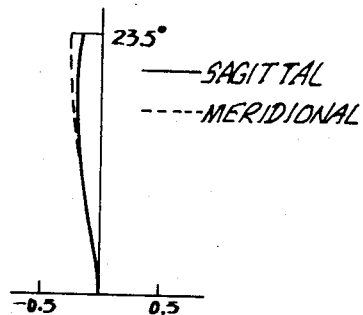
Figure 3C:
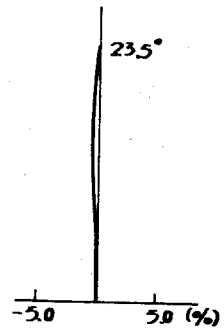
Figure 4A:
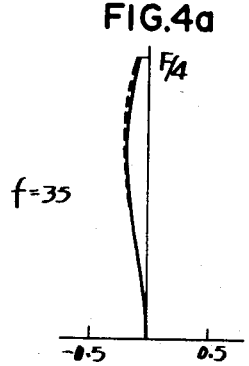
FIGS. 4a, 4b and 4c are graphical plots of various aberrations of the first embodiment for f=35.
Figure 4B:
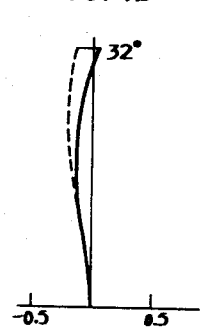
Figure 4C:
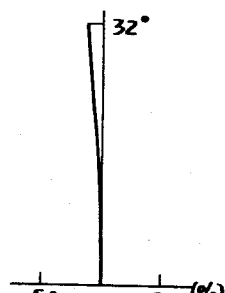
Figure 5A:
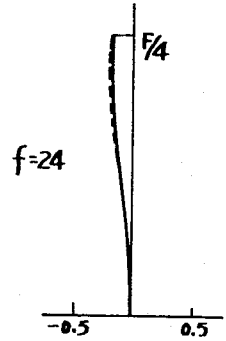
FIGS. 5a, 5b and 5c are respectively graphical plots of various aberrations of the first embodiment for f=24.
Figure 5B:
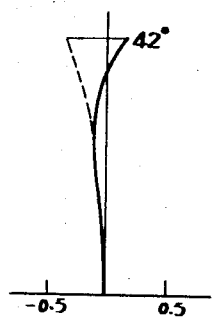
Figure 5C:
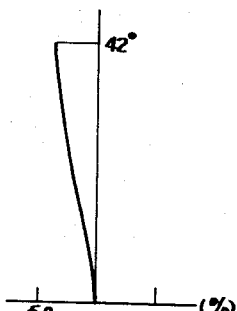
Figure 6A:
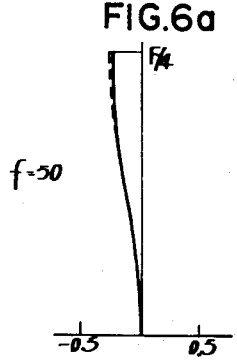
FIGS. 6a, 6b and 6c are respectively graphical plots of various aberrations of a second embodiment of the present invention for f=50.
Figure 6B:
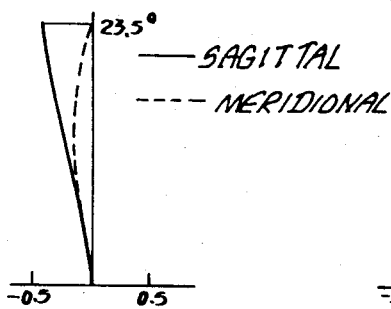
Figure 6C:
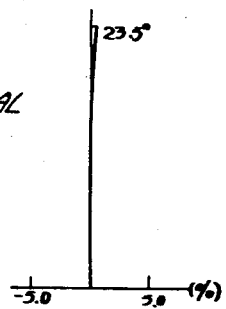
Figure 7A:
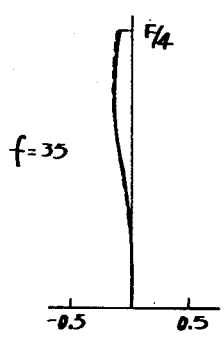
FIGS. 7a, 7b and 7c are respectively graphical plots of various aberrations of the second embodiment for f=35.
Figure 7B:
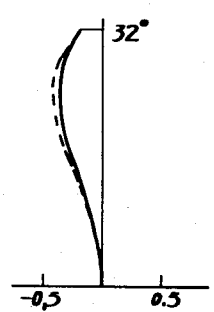
Figure 7C:
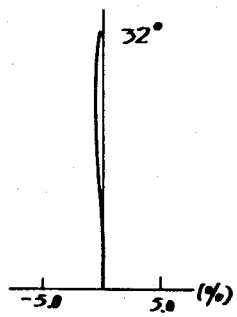
Figure 8A:
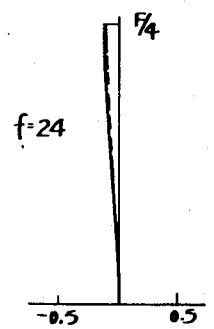
FIGS. 8a, 8b and 8c are respectively graphical plots of various aberrations of the second embodiment for f=24.
Figure 8B:
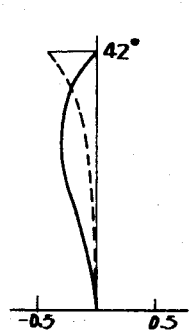
Figure 8C:
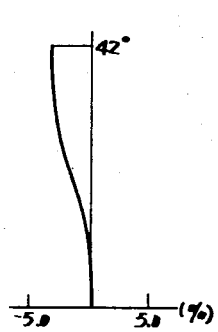

Referring to FIG. 1, a schematic view of the lens system of embodiment 1 is shown at the extreme wide angle setting (f=24). FIG. 2 is likewise a schematic view of the lens system of the embodiment 2 at the extreme wide angle setting (f=24). The respective graphical plots of the aberrations for the embodiment of FIG. 1 are disclosed in FIGS. 3, 4 and 5 for the focal lengths f=50, f=35, and f=24, respectively. FIGS. 6, 7 and 8 provide similar graphical plots of aberrations for the embodiment of example 2 for the focal lengths f=50, f=35, and f=24.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by this specific enclosed embodiments but only by the scope and spirit of the appended claims.

What is claimed is

1. A wide angle zoom lens system capable of providing a variable focal length by varying the relative position of at least two lens groups, comprising;
  a first lens group of overall negative refractive power, $\phi_I$ including a first front lens component of a positive refractive power, $\Phi_{I-1}$, a second intermediate lens component of a negative refractive power, $\Phi_{I-2}$, located at the image side of the first lens component and a third rear lens component of a positive refractive power located at the image side of the second lens component, the second intermediate lens component further having a first lens sub-component of a refractive power, $\phi_1$, a second lens sub-component of a refractive power, $\phi_2$ located at the image side of the first lens sub-component and a third lens sub-component of a refractive power, $\phi_3$ located at the image side of the second sub-component, the respective absolute values of the lens sub-components having the following relationship, $|\phi_1| > |\phi_2| > |\phi_3|$; and
  a second lens group of overall positive refractive power, $\Phi_{II}$ located at the image side of the first lens group including a fourth front lens component of a positive refractive power, $\Phi_{II-1}$, a fifth intermediate lens component of a negative refractive power located at the image side of the fourth lens component and a sixth rear lens component of a positive refractive power located at the image side of the fifth lens component,
  wherein the relationship of the respective refractive powers of the zoom lens system fulfills the following conditions:

$1.1 \leq |\Phi_{II}/\Phi_I| \leq 1.5$ $0.1 \leq |\Phi_{I-1}/\Phi_I| \leq 0.5$ $0.3 \leq |\phi_1/\Phi_{I-2}| \leq 0.6$ $1.4 \leq |\Phi_{II-1}/\Phi_{II}| \leq 1.8$ 2. The invention of claim 1 wherein the third lens sub-component is a doublet.

3. The invention of claim 1 wherein the second lens sub-component is a doublet.

4. The invention of claim 2 wherein the fifth intermediate lens component is a doublet.

5. The invention of claim 3 wherein the fourth front lens component includes more than two lens elements.

6. The invention of claim 5 wherein the third rear lens component is a meniscus lens.

7. A compact wide angle zoom lens system capable of providing a variable focal length comprising the following design parameters;

| f = 50 ~ 24 | FNo. = 4 | Field Angle 2ω = 47° ~ 84° | |
|---|---|---|---|
| Radius of Curvature | Axial Distance | Refractive Index | Abbe Number |
| $r_1$ = 94.69 | $d_1$ = 6.0 | $N_1$ = 1.6000 | $\nu_1$ = 64.4 |
| $r_2$ = 417.7 | $d_2$ = 0.2 | | |
| $r_3$ = 73.24 | $d_3$ = 1.5 | $N_2$ = 1.7435 | $\nu_2$ = 49.2 |
| $r_4$ = 21.13 | $d_4$ = 7.5 | | |
| $r_5$ = 148.3 | $d_5$ = 1.5 | $N_3$ = 1.7435 | $\nu_3$ = 49.2 |
| $r_6$ = 32.70 | $d_6$ = 3.5 | | |
| $r_7$ = 129.8 | $d_7$ = 4.0 | $N_4$ = 1.7106 | $\nu_4$ = 43.3 |
| $r_8$ = −86.70 | $d_8$ = 1.0 | $N_5$ = 1.6385 | $\nu_5$ = 55.7 |
| $r_9$ = 66.78 | $d_9$ = 2.5 | | |
| $r_{10}$ = 33.47 | $d_{10}$ = 3.0 | $N_6$ = 1.7174 | $\nu_6$ = 29.4 |
| $r_{11}$ = 78.98 | $d_{11}$ = 1.66, 11.96, 27.93 | | |
| $r_{12}$ = 53.95 | $d_{12}$ = 2.5 | $N_7$ = 1.5168 | $\nu_7$ = 64.0 |
| $r_{13}$ = −159.9 | $d_{13}$ = 0.1 | | |
| $r_{14}$ = 19.80 | $d_{14}$ = 3.36 | $N_8$ = 1.5168 | $\nu_8$ = 64.0 |
| $r_{15}$ = 136.34 | $d_{15}$ = 0.1 | | |
| $r_{16}$ = 22.44 | $d_{16}$ = 2.0 | $N_9$ = 1.5168 | $\nu_9$ = 64.0 |
| $r_{17}$ = 32.82 | $d_{17}$ = 4.5 | | |
| $r_{18}$ = −61.82 | $d_{18}$ = 2.0 | $N_{10}$ = 1.8052 | $\nu_{10}$ = 25.4 |
| $r_{19}$ = −24.57 | $d_{19}$ = 0.8 | $N_{11}$ = 1.7569 | $\nu_{11}$ = 29.7 |
| $r_{20}$ = 18.24 | $d_{20}$ = 2.19 | | |
| $r_{21}$ = −57.47 | $d_{21}$ = 2.0 | $N_{12}$ = 1.5168 | $\nu_{12}$ = 64.0 |
| $r_{22}$ = −20.76 | $d_{22}$ = 0.1 | | |
| $r_{23}$ = 38.02 | $d_{23}$ = 2.3 | $N_{13}$ = 1.6000 | $\nu_{13}$ = 64.4 |
| $r_{24}$ = −375.8 | | | |

8. A compact wide angle zoom lens system capable of providing a variable focal length comprising the following design parameters;

| f = 50 ~ 24 | FNo. = 4 | Field Angle 2ω = 47° ~ 84° | |
|---|---|---|---|
| Radius of Curvature | Axial Distance | Refractive Index | Abbe Number |
| $r_1$ = 88.282 | $d_1$ = 5.5 | $N_1$ = 1.6129 | $\nu_1$ = 37.0 |
| $r_2$ = 245.72 | $d_2$ = 0.2 | | |
| $r_3$ = 68.959 | $d_3$ = 1.5 | $N_2$ = 1.7425 | $\nu_2$ = 52.2 |
| $r_4$ = 22.913 | $d_4$ = 8.0 | | |
| $r_5$ = 106.47 | $d_5$ = 4.5 | $N_3$ = 1.7352 | $\nu_3$ = 40.9 |
| $r_6$ = −122.30 | $d_6$ = 1.0 | $N_4$ = 1.7003 | $\nu_4$ = 47.7 |
| $r_7$ = 36.438 | $d_7$ = 3.9 | | |
| $r_8$ = 131.29 | $d_8$ = 1.2 | $N_5$ = 1.7130 | $\nu_5$ = 53.9 |
| $r_9$ = 80.156 | $d_9$ = 2.5 | | |
| $r_{10}$ = 30.936 | $d_{10}$ = 4.0 | $N_6$ = 1.6259 | $\nu_6$ = 35.7 |
| $r_{11}$ = 59.160 | $d_{11}$ = 1.7, 15.7, 35.5 | | |
| $r_{12}$ = 53.715 | $d_{12}$ = 3.5 | $N_7$ = 1.5891 | $\nu_7$ = 61.1 |
| $r_{13}$ = −80.203 | $d_{13}$ = 1.0 | $N_8$ = 1.5762 | $\nu_8$ = 41.4 |
| $r_{14}$ = −152.44 | $d_{14}$ = 0.1 | | |
| $r_{15}$ = 21.005 | $d_{15}$ = 4.0 | $N_9$ = 1.5168 | $\nu_9$ = 64.0 |
| $r_{16}$ = 115.51 | $d_{16}$ = 0.1 | | |
| $r_{17}$ = 24.086 | $d_{17}$ = 2.0 | $N_{10}$ = 1.5168 | $\nu_{10}$ = 64.0 |
| $r_{18}$ = 34.240 | $d_{18}$ = 4.0 | | |
| $r_{19}$ = −75.602 | $d_{19}$ = 1.8 | $N_{11}$ = 1.7569 | $\nu_{11}$ = 31.8 |
| $r_{20}$ = 19.944 | $d_{20}$ = 2.9 | | |
| $r_{21}$ = −66.497 | $d_{21}$ = 2.7 | $N_{12}$ = 1.6510 | $\nu_{12}$ = 55.8 |
| $r_{22}$ = −31.604 | $d_{22}$ = 0.1 | | |
| $r_{23}$ = 114.90 | $d_{23}$ = 3.0 | $N_{13}$ = 1.6510 | $\nu_{13}$ = 55.8 |
| $r_{24}$ = −49.290 | | | |

* * * * *

UNITED STATES PATENT AND TRADEMARK OFFICE
CERTIFICATE OF CORRECTION

PATENT NO. : 4,147,410
DATED : April 3, 1979
INVENTOR(S) : Masaichi Shimomura and Mitsuaki Horimoto It is certified that error appears in the above-identified patent and that said Letters Patent are hereby corrected as shown below:

In Col. 3, line 31 delete "powder" and insert --power--.

In Col. 5, line 11 delete "$|\phi 1|>|\phi 2|1>|\phi 3|$" and insert --$|\phi 1|>|\phi 2|>|\phi 3|$--.

In Col. 6, line 38 delete "$d_{20} = 2.0$" and insert --$d_{21} = 2.0$--.

Signed and Sealed this

Thirty-first Day of July 1979

[SEAL]

Attest:

Attesting Officer

LUTRELLE F. PARKER
*Acting Commissioner of Patents and Trademarks*